United States Patent
Jauriqui et al.

(10) Patent No.: US 11,371,965 B2
(45) Date of Patent: Jun. 28, 2022

(54) DIGITAL TWIN MODEL INVERSION FOR TESTING

(71) Applicant: VIBRANT CORPORATION, Albuquerque, NM (US)

(72) Inventors: Leanne Jauriqui, Albuquerque, NM (US); Thomas Köhler, Diez (DE); Alexander J. Mayes, Albuquerque, NM (US); Julieanne Heffernan, Albuquerque, NM (US); Richard Livings, Albuquerque, NM (US); Eric Biedermann, Albuquerque, NM (US)

(73) Assignee: Vibrant Corporation, Albuquerque, NM (US)

( * ) Notice: Subject to any disclaimer, the term of this patent is extended or adjusted under 35 U.S.C. 154(b) by 0 days.

(21) Appl. No.: 17/291,746

(22) PCT Filed: Jul. 9, 2020

(86) PCT No.: PCT/US2020/041391
§ 371 (c)(1),
(2) Date: May 6, 2021

(87) PCT Pub. No.: WO2021/007421
PCT Pub. Date: Jan. 14, 2021

(65) Prior Publication Data
US 2021/0382016 A1 Dec. 9, 2021

Related U.S. Application Data

(60) Provisional application No. 62/872,548, filed on Jul. 10, 2019.

(51) Int. Cl.
*G01N 29/00* (2006.01)
*G06F 30/20* (2020.01)
(Continued)

(52) U.S. Cl.
CPC ......... *G01N 29/4418* (2013.01); *G01N 29/04* (2013.01); *G01N 29/52* (2013.01);
(Continued)

(58) Field of Classification Search
CPC .......... G06F 30/13; G06F 30/17; G06F 30/20; G06F 2119/18; G06F 2119/02;
(Continued)

(56) References Cited

U.S. PATENT DOCUMENTS

| | | | | |
|---|---|---|---|---|
| 5,642,477 | A | * 6/1997 | de Carmo | G06F 16/40 713/400 |
| 2013/0074600 | A1 | 3/2013 | Hunter et al. | |

(Continued)

FOREIGN PATENT DOCUMENTS

| | | |
|---|---|---|
| EP | 3133513 A2 | 2/2017 |
| WO | 2012177659 A2 | 12/2012 |

OTHER PUBLICATIONS

Biedermann et al., "Process Compensated Resonance Testing Modeling for Damage Evolution and Uncertainty Quantification" AIP Conference Proceedings, vol. 1806, Feb. 16, 2017.

(Continued)

*Primary Examiner* — Phallaka Kik
(74) *Attorney, Agent, or Firm* — Holzer Patel Drennan

(57) ABSTRACT

Creation and use of a digital twin instance (DTI) for a physical instance of the part. The DTI may be created by a model inversion process such that model parameters are iterated until a convergence criterion related to a physical resonance inspection result and a digital resonance inspection result is satisfied. The DTI may then be used in relation to part evaluation including through simulated use of the part. The physical instance of the part may be evaluated by (Continued)

way of the DTI or the DTI may be used to generate maintenance schedules specific to the physical instance of the part.

24 Claims, 13 Drawing Sheets

(51) Int. Cl.
| | |
|---|---|
| *G06F 30/13* | (2020.01) |
| *G06F 30/17* | (2020.01) |
| *G01N 29/44* | (2006.01) |
| *G01N 29/04* | (2006.01) |
| *G01N 29/52* | (2006.01) |
| *G06F 119/18* | (2020.01) |
| *G06F 119/02* | (2020.01) |

(52) U.S. Cl.
CPC .............. *G06F 30/20* (2020.01); *G06F 30/13* (2020.01); *G06F 30/17* (2020.01); *G06F 2119/02* (2020.01); *G06F 2119/18* (2020.01); *G06T 2207/20072* (2013.01); *G06T 2207/20076* (2013.01); *G06T 2207/20096* (2013.01); *G06T 2207/20132* (2013.01)

(58) Field of Classification Search
CPC .... G01N 29/4418; G01N 29/04; G01N 29/52; G06T 2207/20076; G06T 2207/20072; G06T 2207/2004; G06T 2207/20096; G06T 2207/20132
USPC ..................................... 702/33, 124; 703/1, 6
See application file for complete search history.

(56) References Cited

U.S. PATENT DOCUMENTS

| | | | |
|---|---|---|---|
| 2014/0204700 A1* | 7/2014 | Valero | G01N 29/46 367/87 |
| 2014/0357324 A1* | 12/2014 | Ahgren | H04M 9/082 455/570 |
| 2017/0089867 A1 | 3/2017 | Hunter et al. | |
| 2017/0323239 A1 | 11/2017 | Johnson et al. | |
| 2019/0102494 A1 | 4/2019 | Mars | |
| 2020/0088692 A1 | 3/2020 | Tat et al. | |
| 2020/0160506 A1 | 5/2020 | Dominguez et al. | |

OTHER PUBLICATIONS

Heffernan et al., "Process Compensated Resonance Testing Models for Quantification of Creep Damage in Single Crystal Nickel-Based Superalloys", Materials Evaluation, vol. 75, No. 7, Jul. 1, 2017.

Mayes et al., "Part-to-itself Model Inversion in Process Compensated Resonance Testing", AIP Conference Proceedings, vol. 1949, Apr. 20, 2018.

Inoue et al. "Minimization of the Vibration Energy of Thin-Plate Structures and the Application to the Reduction of Gearbox Vibration," Army '106878 Technical Report ARL-TR-722, Dec. 31, 1995, [retrieved on Nov. 27, 2020].

Johansen. "On Developing a Digital Twin for Fault Detection in Drivetrains of Offshore Wind Turbines," Norwegian U , Dept of Marine Tech., Jun. 2018 [retrieved on Nov. 27, 2020]. <URL: https://ntnuopen.ntnu.no/ntnu-xmlui/handle/11250/2564462>.

Mayes et al. "Process Compensated Resonance Testing (PCRT) Inversion for Material Characterization and Digital Twin Calibration", May 8, 2019, [retrieved on Nov. 27, 2020], Retrieved from the Internet: <URL: https://aip.scitation.org/doi/10.1063/1.5099723>.

* cited by examiner

DIGITAL TWIN MODEL INVERSION FOR TESTING

RELATED APPLICATIONS

The present application is related to PCT Application No. PCT/US2019/031024 filed 7 May 2019, entitled "RESONANCE INSPECTION OF MANUFACTURED PARTS WITH WITNESS COUPON TESTING" which is specifically incorporated by reference for all that it discloses and teaches.

The present application is also related to U.S. patent application Ser. No. 13/278,380 filed 21 Oct. 2011, entitled "UTILIZING RESONANCE INSPECTION OF IN-SERVICE PARTS" and U.S. Pat. No. 9,157,788 filed 19 Jun. 2012, entitled "PART EVALUATION SYSTEM/METHOD USING BOTH RESONANCE AND SURFACE VIBRATION DATA" both of which are specifically incorporated by reference for all that they disclose and teach.

The present application is a U.S. National Stage Application of PCT/US2020/041391, filed on Jul. 9, 2020, which claims benefit of priority to U.S. Provisional Application No. 62/872,548 filed 10 Jul. 2019, entitled "DIGITAL TWIN MODEL INVERSION FOR TESTING," which is specifically incorporated by reference for all that it discloses and teaches.

STATEMENT REGARDING FEDERALLY SPONSORED RESEARCH OR DEVELOPMENT

This invention was made with government support under a Materials and Manufacturing Directorate (AFRL/RX) Structural Materials Broad Agency Announcement (BAA) Contract FA8650-15-C-5208 awarded by the U.S. Air Force Research Laboratory (AFRL). The government has certain rights in the invention.

BACKGROUND

Non-destructive testing of parts provides valuable information that may be used to evaluate parts. Because non-destructive testing does not degrade the performance a part, approaches in which every part that is produced is subjected to non-destructive testing are realized to assist in quality control processes for parts. Often parts subjected to non-destructive testing are highly scrutinized parts such as those used in the aerospace industry or the like.

Non-destructive testing may include resonance inspection of a part. Resonance inspection may include resonance ultrasound spectroscopy (RUS) in which a part is subjected to a sweep of input frequencies. The part's resonance response to the input frequencies may be measured. The resonance response provides resonance inspection results that may be evaluated to make a determination about the part (e.g., whether the part is compliant to predetermined standards or is not compliant to predetermined standards).

While the use of non-destructive testing such as RUS provides advantages to part evaluation and testing, the need persists to provide improved testing approaches to more accurately determine flaws or faults in parts, determine a useful lifespan of a part, determine if a part is aging appropriately, or other determinations related to a part.

SUMMARY

The present disclosure includes a method for model inversion of a digital model of a part to create a digital twin instance (DTI) that represents a physical instance of the part. The method includes inputting evaluation model parameters to the digital model and conducting one or more convergence digital analyses on the digital model using the evaluation model parameters to obtain an evaluation digital resonance inspection result based on the evaluation model parameters. The method also includes determining convergence parameters from the evaluation model parameters that result in the evaluation digital resonance inspection result that satisfies at least one convergence criterion relative to a physical resonance inspection result of the physical instance of the part. The convergence criterion may be at least in part based on matching resonance peaks based on corresponding vibrational mode shapes between the evaluation digital resonance inspection and the physical resonance inspection result. The method also includes assigning the convergence parameters to the digital model to define a DTI specific to the physical instance of the part.

The DTI of the physical instance of the part may facilitate further evaluation of the physical instance of the part. The DTI may be a faithful digital representation of the physical instance of the part that includes agreement in dimension, material state, and the like. As such, the DTI may be further used in evaluation of the specific physical instance of the part associated with the DTI. This may include evaluation of the physical instance of the part prior to being put into service by, for example, performing digital analysis of the DTI to determine if the physical instance of the part is projected to perform as expected or to minimum performance standards.

The DTI may also be used in relation to the specific physical instance of the part to create a tailored maintenance schedule for the specific physical instance of the part that may consider factors such as the material properties of the physical instance of the part, operational use parameters of the part, and environmental parameters in which the part has been or is projected to be used. Other evaluation of the physical instance of the part may be facilitated using a DTI for the physical instance of the part or in a DTI system including one or more DTIs of physical instances of parts as will be described in greater detail below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The present disclosure generally relates to generation and use of a digital twin instance (DTI) of a physical instance of the part. Digital models of parts allow for a number of advantages in relation to creation and use of parts. However, often digital models represent a nominal version of a part. Such a nominal version of the part may not consider or improperly consider real-world effects associated with a physical implementation of the nominal part. For example, real, physical parts may have variations in dimensions, material state, or other characteristics relative to the nominal part that are created by manufacturing tolerances or the like. Moreover, and especially in highly engineered parts used in high performance or high demand scenarios, the effect of a material state of the parts may be significant. Digital models that do not account for these variations between a nominal modeled part and an actual physical instance of the part may lead to discrepancies between real-world performance of the part and modeled digital performance of the part. In turn, a factor of safety or other conservative modeling assumptions may be utilized that are applied to all physical implementations of the nominal part. As can be appreciated, such global treatment of parts may result in cost and time inefficiencies as the highest performing parts may be treated equally with the lowest performing parts of a given nominal part definition.

In turn, creation and use of a DTI may create a statistically proven, faithful representation of a physical instance of a part that may take into account specific dimensions, material state, or other parameters related to the physical instance of the part. The specific physical instance of the part may then be evaluated digitally using the DTI, which may enhance the evaluation of the physical instance of the part. Accordingly, the following disclosure generally presents a discussion of creation of the DTI for a given physical instance of a part. Additionally, the present disclosure presents a number of approaches facilitated by a DTI of a physical instance of a part.

Figure 1:
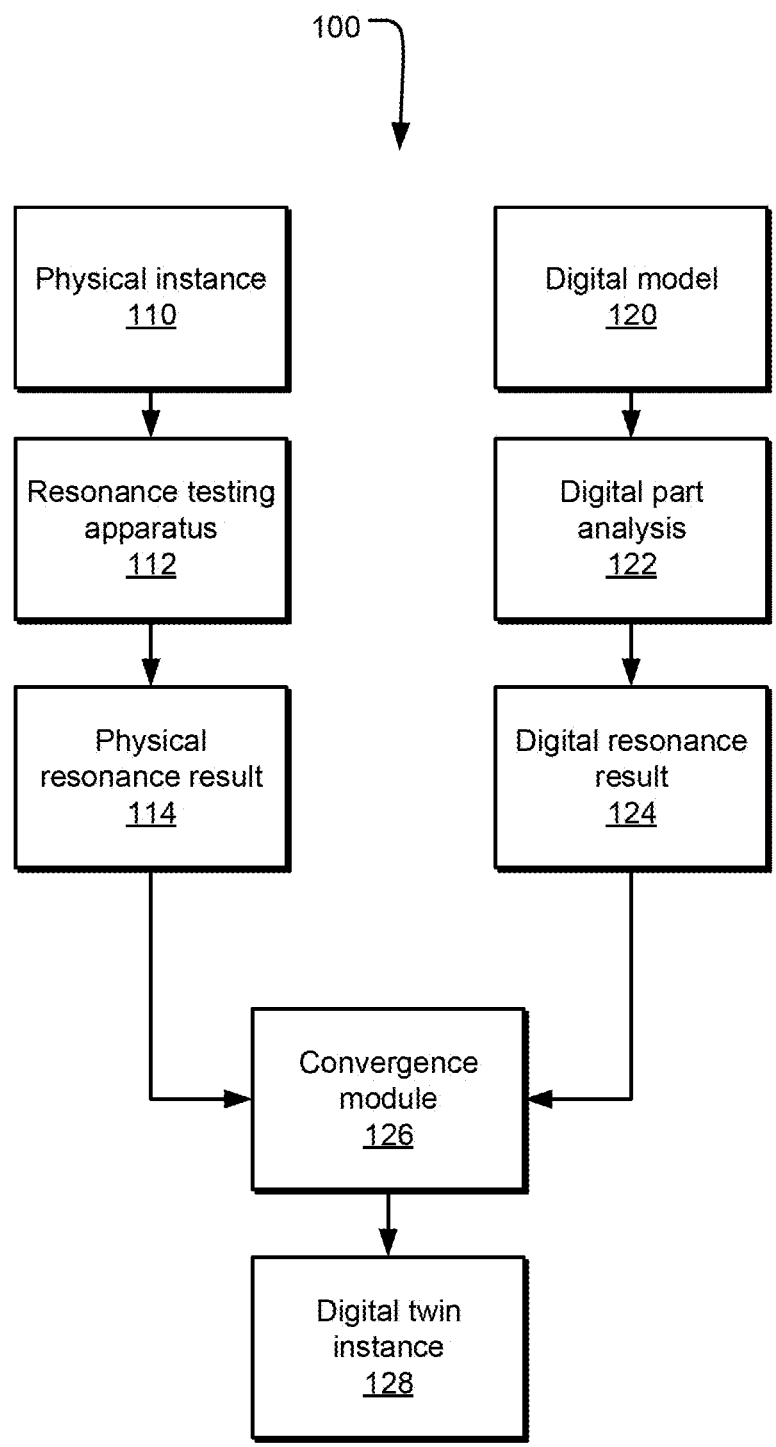
FIG. 1 depicts an example of an environment for creation of a digital twin instance of a physical instance of a part.

FIG. 1 depicts an example environment 100 for creating a DTI of a physical part. A physical instance 110 of a part may be provided. Also, a digital model 120 of the part may be provided. The digital model 120 is a nominal representation of a part as designed. For instance, the digital model 120 may comprise a three-dimensional computer-aided drafting (CAD) model of a part. In at least some examples, the CAD model may be further represented as a finite element model of the part to facilitate application of a digital analysis such as finite element analysis (FEA) as described in greater detail below. The digital model 120 has nominal dimensions of an idealized part created in a digital environment. The physical instance 110 of the part is a physical embodiment of the nominal part represented by the digital model 120. As described above, the physical instance of the part may include variations associated with one or more manufacturing techniques, raw material limitations, or other factor that creates disparity between the nominal part represented by the digital model 120 and the physical instance 110 of the part.

For example, the digital model 120 may define a nominal shape and nominal dimensions of the part. The digital model 120 may be used to generate plans for manufacture of the part. The physical instance 110 of the part may be manufactured using any appropriate manufacturing technique. Examples may include casting operations, forging operations, machining operations, additive manufacturing operations, extrusion operations, crystal growth operations, or any other appropriate technique for manufacturing.

Regardless of the manufacturing technique(s) used to produce the physical instance 110 of the part, discrepancies between the digital model 120 and the physical instance 110 of the part may exist. Such discrepancies may include dimensional variances (e.g., even within an acceptable tolerance applied to the physical instance 110 relative to the nominal part), material state variances (e.g., including potential differences in stress state, integrity, crystal orientation, isotropy, or material homogeneity between the physical instance 110 and the digital model 120), or the like. In this regard, each individual physical instance 110 of the nominal part defined by the digital model 120 may have different performance characteristics relative to the nominal part. These differences in performance characteristics may be significant enough to alter part suitability even for parts within individual tolerance values established for a physical instance 110 relative to the nominal part.

Accordingly, the environment 100 depicted in FIG. 1 may be used to generate a digital twin instance (DTI) 128, which is a particular digital model that individually relates to a corresponding physical instance 110 of a part. As such, a unique DTI may be created for each part produced. Initially, upon production of a physical instance 110 of a part, the physical instance 110 of the part may be measured using highly precise and accurate measuring techniques. This may include hand-measurement, semi-automated measuring, or automated measuring techniques. For example, structured light scanning may be used to determine actual part dimensions for the physical instance of the part. These highly accurate measurements may be provided to the digital model 120 such that the nominal dimensions of the part are updated with the actual specific dimensions for a given physical instance 110 of the part. This refinement of the dimensions of the DTI 128 may occur prior to the convergence optimization performed by the convergence module 126 described below. Alternatively, actual part dimensions may be determined using a convergence approach described in greater detail below.

Figure 7:
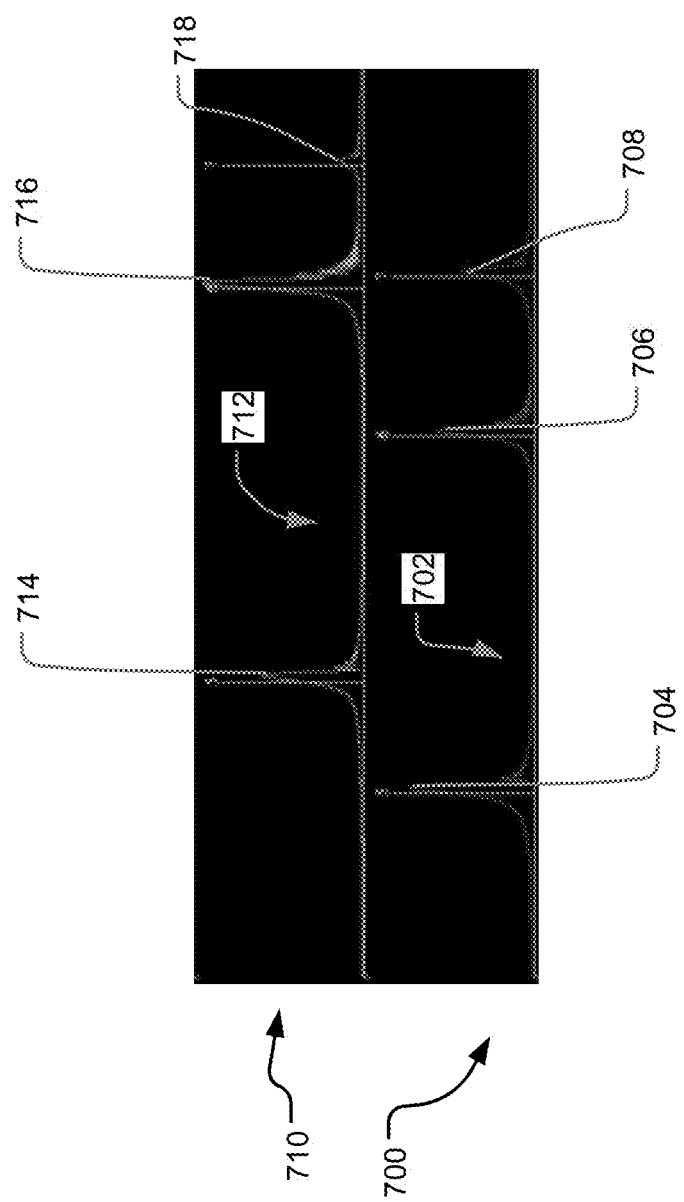
FIG. 7 depicts an example physical resonance inspection result and an example digital resonance inspection result prior to model convergence.

Additionally, the physical instance 110 of the part may undergo resonance inspection testing in a resonance testing apparatus 112. In turn, the resonance testing apparatus 112 may generate physical resonance inspection result 114 that is specific to the physical instance 110 of the part. One example of such a physical resonance inspection result 114 is depicted in FIG. 7. FIG. 7 depicts a frequency domain plot 700 of a frequency response 702 of the physical part. Of note, the frequency response 702 may include resonance frequency peaks at different respective frequencies. Specifically, a first resonance peak 704, a second resonance peak 706, and a third resonance peak 708 are shown. Each resonance peak 704-708 of the frequency response 702 may be associated with a vibrational mode shape. The vibrational mode shapes may be determined using surface vibrational analysis or any other appropriate technique for identifying mode shapes in the frequency response 702. In the example depicted in FIG. 7, the first resonance peak 704 may be associated with a torsional mode shape, the second resonance peak 706 may be associated with an extension mode shape, and the third resonance peak 708 may be associated with a bending mode shape. As will be described in greater detail below, identification of the mode shape associated with each resonance peak may be used to match corresponding resonance peaks in modeled digital resonance results such that resonance peaks having common vibrational modes may be properly compared between the digital model and the physical instance of the part.

With return to FIG. 1, the digital model 120 of the part may undergo digital part analysis 122 to generate a digital resonance inspection result 124. The digital part analysis 122 may include a simulated, digital resonance inspection of the digital model 120. The digital resonance inspection may include a finite element analysis (FEA) that characterizes the digital model's free-free modal response, or how the digital model 120 responds to vibrational inputs corresponding to the frequency sweep used in a physical resonance inspection of the physical instance of the part. The simulated, digital resonance inspection may also include forced-response modeling.

The digital part analysis 122 may be any appropriate analytical technique applied to the digital model 120. Such analytical technique may be applied using a computer program such as a CAD program or the like. In an example, the digital analysis 122 includes a FEA approach applied to the digital model 120. In turn, the resonance response 712 of the digital model 120 may be measured in response to simulated input vibrations corresponding to the input vibrations of the resonance testing apparatus 112. One example of such a digital resonance inspection result 124 is depicted in FIG. 7. FIG. 7 depicts a digital frequency domain plot 710 of a digital frequency response 712 of the digital model of the part. Of note, the digital frequency response 712 may also include resonance frequency peaks at different respective frequencies. As can also be appreciated in FIG. 7, each resonance frequency peak of the frequency response 712 may also be associated with an identified vibrational mode shape. The vibrational mode shapes may be determined based on the part response modeled in the FEA or any other appropriate technique for identifying mode shapes in the digital frequency response 712. The digital resonance response 712 includes a first resonance peak 714, a second resonance peak 716, and a third resonance peak 718. Like in the physical resonance response 702, the resonance peaks 714-718 in the digital resonance response 712 may have associated vibrational modes that are identified during the digital part analysis 122. For example, the first resonance peak 714 is associated with a torsional mode shape, the second resonance peak 716 is associated with an extension mode shape, and the third resonance peak 718 is associated with a bending mode shape.

In turn, the physical resonance inspection result 114 and the digital resonance inspection result 124 may be provided to a convergence module 126. As can be appreciated in FIG. 7, the resonance response 702 may differ from the digital resonance response 712. This may indicate error in assumed digital model parameters used in the digital part analysis 122 used to create the digital frequency response 712. Of note, the resonance peaks 704-708 in the resonance response 702 may be compared to resonance peaks 714-718 in the digital resonance response 712 such that resonance peaks for corresponding or common mode shapes are compared for evaluation. That is, as can be seen in FIG. 7, the third resonance peak 708 for of the frequency response 702 generally aligns with the second frequency resonance peak 716 for the digital frequency response 712. However, these are not common vibrational modes as the second frequency resonance peak 716 is an extension vibrational mode and the third resonance peak 708 is a torsional vibrational mode. As such, without identification of the mode shape for each resonance peak, corresponding resonance peaks may not be accurately compared, thus resulting in errors between the model and the physical part. In the illustrated example, when comparing appropriate resonance peaks 704 and 714 associated with a torsional vibrational mode, resonance peaks 706 and 716 associated with an extension vibrational mode, and resonance peaks 708 and 718 associated with a bending vibrational mode, it is clear that significant error exists between the physical resonance response 702 and the digital resonance response 712.

As will be described in greater detail below, a convergence module 126 may manipulate model parameters for the digital model 120. The digital model 120 may undergo further digital part analysis 122 using modified model parameters. The modified model parameters are referred to as evaluation model parameters as these parameters are evaluated and iterated until the physical resonance inspection result 114 and the digital resonance inspection result 124 satisfy at least one convergence criterion. In other examples, a plurality of convergence criteria may be satisfied prior to convergence. In any regard, the model parameters that result in convergence are designated as convergence model parameters, which are assigned to the digital model 120 to define the DTI 128 for the physical instance 110.

Figure 8:
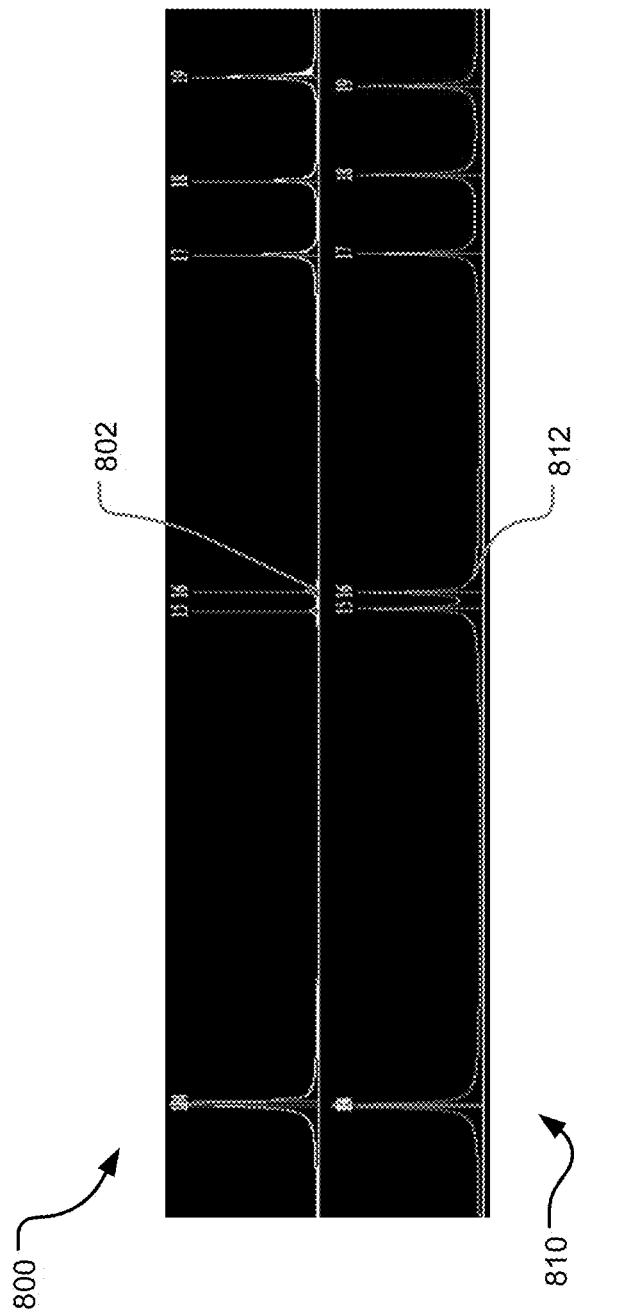
FIG. 8 depicts an example physical resonance inspection result and an example digital resonance inspection result after model convergence.

The one or more convergence criterion may, in an example, relate to the correspondence between frequency resonance peaks in the physical resonance result and the digital resonance result. As such, the results in FIG. 7 provide an example that does not satisfy the convergence criterion. In any regard, the convergence module 126 may be operative to vary evaluation model parameters and compare the digital resonance response for each set of modified evaluation model parameters to the physical resonance inspection result 114. This may be repeated until convergence is achieved. With further respect to FIG. 8, a frequency domain plot 800 includes a physical frequency response 802. FIG. 8 also includes a digital frequency domain plot 810 that includes a digital frequency response 812. As can be appreciated, convergence may be satisfied by these results as the frequency resonance peaks for each corresponding mode shape in each response 802 and 812 may correspond to within a predefined frequency threshold.

Accordingly, the DTI 128 may be particular to a given physical instance 110. For example, each physical instance 110 of the part may have an assigned serial number for use in tracking specific individual physical instances 110 of the part. A DTI 128 may be generated for each physical instance 110 of the part. As such, the DTI 128 for a given physical instance 110 may have a digital serial number. The digital serial number may be the same as a serial number for the physical instance 110 of the part. Alternatively, the digital serial number for a DTI 128 may be uniquely associated with the serial number for the physical instance 110. In any regard, the DTI 128 may be specific to a given physical instance 110 of a part such that a unique correspondence between the DTI 128 and the physical instance 110 is provided.

Figure 2:
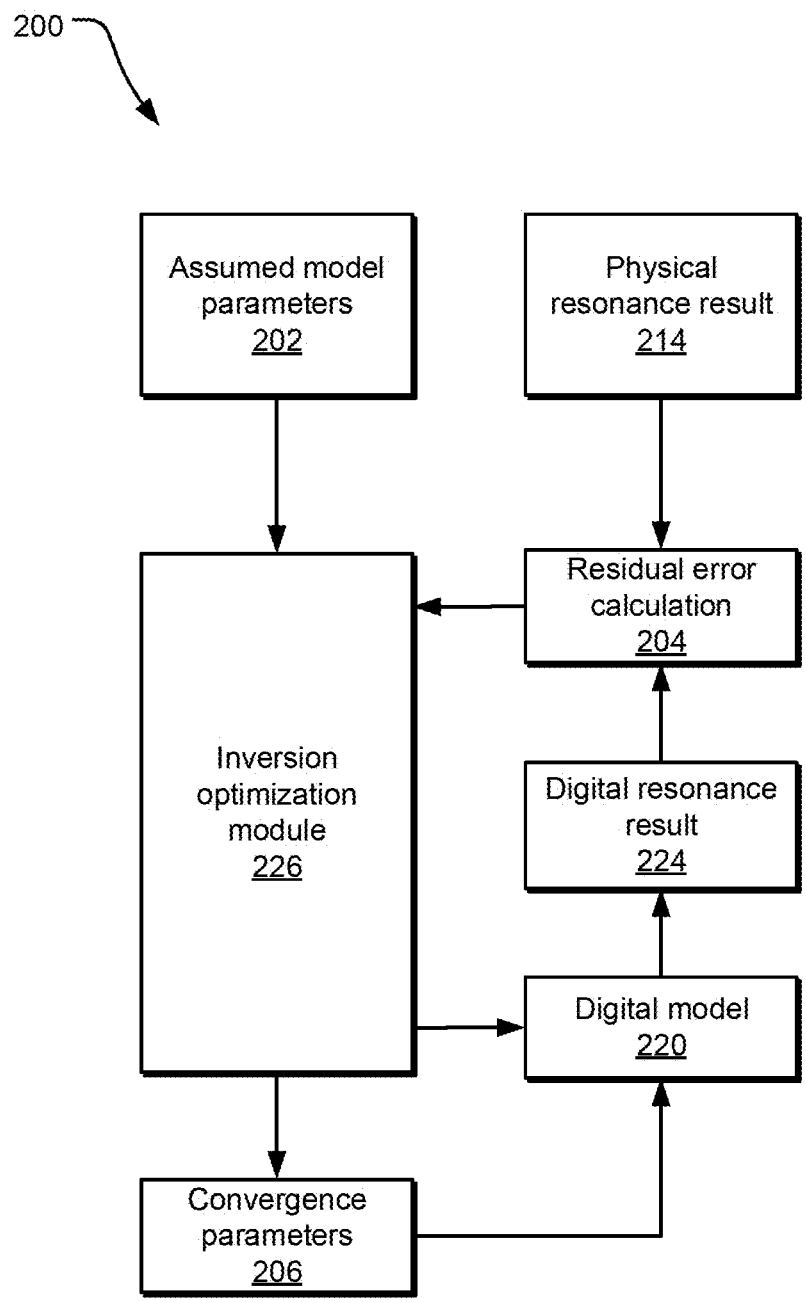
FIG. 2 depicts an example of a system for performing convergence analysis to create a digital twin instance of a physical instance of a part.

FIG. 2 depicts a more detailed example of a system 200 for use in generating a DTI 128 for a physical instance 110 of a part. The system 200 includes an inversion optimization module 226. Assumed model parameters 202 may be provided to the inversion optimization module 226. In turn, the inversion optimization module 226 may use the assumed model parameters 202 with a digital model 220 comprising a nominal part representation of a physical instance of a part or a dimensionally corrected digital model of the part. The digital model 220 may undergo digital resonance inspection (e.g., using an FEA approach or the like) on the basis of the assumed model parameters 202 to provide a digital resonance result 224. The digital resonance result 224 is compared to a physical resonance result 214 obtained from a resonance inspection of a physical instance of the part in a residual error calculation 204.

The residual error calculation 204 may represent a quantification of the residual error between the physical resonance result 214 and the digital resonance result 224. For instance, continuing the example depicted in FIG. 7, residual error may represent differences in frequencies of resonance peaks of corresponding vibrational mode shapes between the physical frequency response 702 and the digital frequency response 712. Error may also be determined relative to relational values (e.g., the span of frequencies between resonance peaks) between respective frequency resonance peaks for different modes. The residual error calculation 204 may include differences in amplitude, damping, or phase as well. In an example, the residual error calculation 204 may be the root-mean-square of the residual errors (RMSE) between the physical resonance result 214 and the digital resonance result 224.

The residual error calculation 204 may be provided to the inversion optimization module 226 to determine if one or more convergence criteria are satisfied as represented by the residual error calculation 204. That is, the convergence criterion may relate to a residual error value below a threshold. Alternatively, the convergence criterion may relate to a threshold differential between subsequent iterations of the assumed model parameters 202. If the convergence criterion is not met, the inversion optimization module 226 changes the assumed model parameters 202. The changed assumed model parameters 202 may be referred to as evaluation model parameters, which may be iterated until a convergence criterion has been met.

The evaluation model parameters may be generated by varying the model parameters in any appropriate manner. As may be appreciated, the model parameters may be multidimensional with any appropriate number of dimensions to accurately reflect applicable model parameters. Examples of model parameters may relate to material state, material orientations, physical dimensions, or the like. For example, the material state included in the input model parameters may be reflected in one or more parameters related to one or more modulus values (e.g., elastic modulus, plastic modulus, Young's modulus), Poisson's ratio, Zener's anisotrophy ratio, mass, density, stress state, integrity, isotropy, homogeneity, or other material property. The material orientation parameters may include one or more values related to orientation of a grain or crystal structure within the part. This may include angles relative to one or more part datums or angles of rotation of the grain or crystal structure. Physical dimensions may also be included in the model parameters. In turn, a model parameter be any appropriate physical dimension of the part. In at least one example, the physical dimensions may be set parameters based on measured values for the physical instance of the part. The model parameters may also include stress state information for the part.

The input model parameters may be varied to test any number of combinations of parameters within a multidimensional distribution. For instance, random sampling, Latin hypercube sampling, or orthogonal sampling may be applied to vary the evaluation input model parameters for use in iterations to achieve convergence and determine convergence model parameters. Further still, some model parameters may be fixed (e.g., if an actual part dimension is explicitly measured as described above).

Accordingly, the inversion optimization module 226 may continue to iterate within the multidimensional distribution representing the evaluation model parameters. Once a set of evaluation model parameters are identified that result in convergence between the physical resonance result 214 and the digital resonance result 224, the inversion optimization module 226 may output these model parameters as convergence model parameters 206. The convergence model parameters 206 may be assigned to the digital model 220 to create a DTI for a given physical instance of a part.

Figure 3:
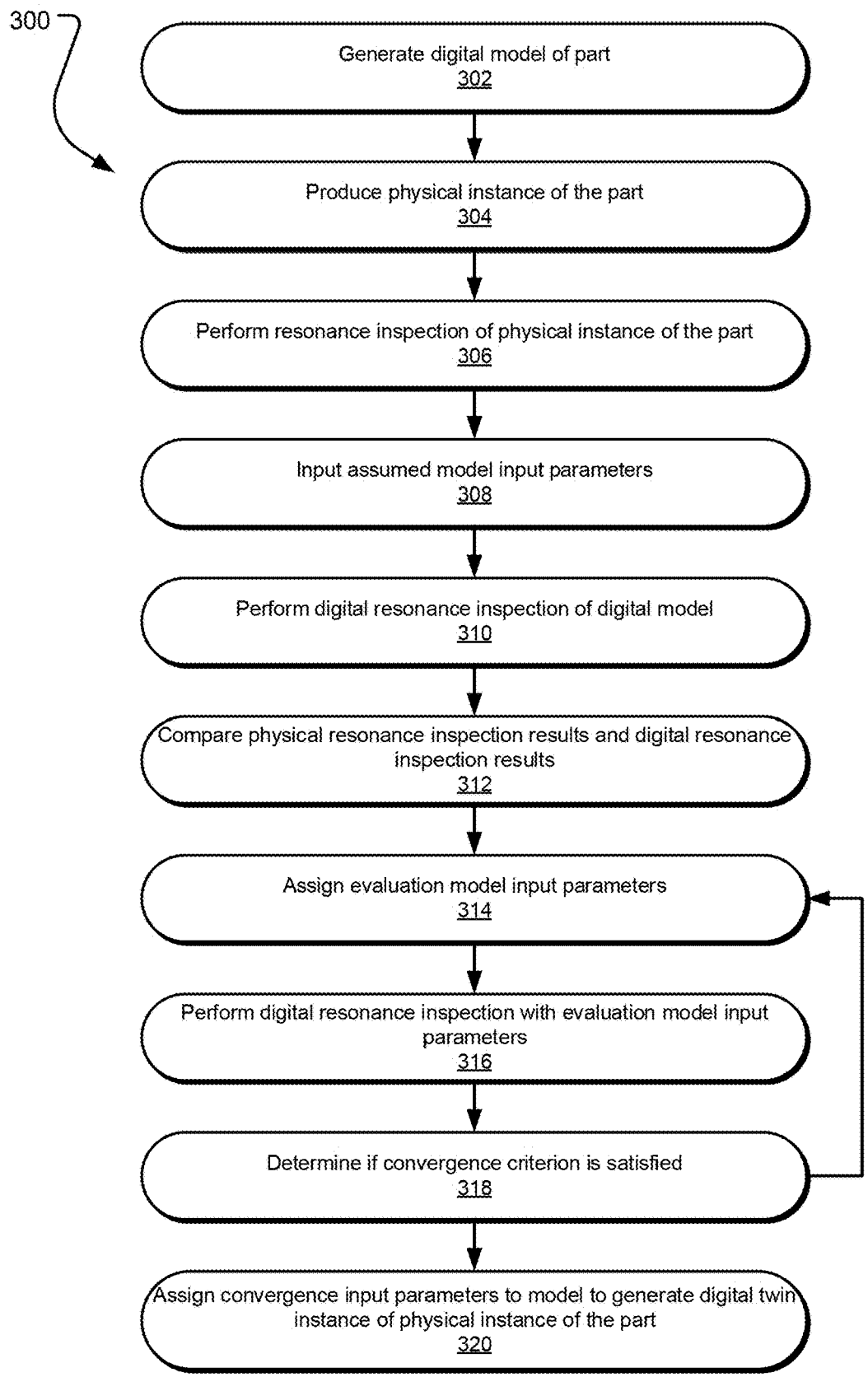
FIG. 3 depicts example operations for creation of a digital twin instance for a physical instance of a part.

FIG. 3 depicts example operations 300 for model inversion. A generating operation 302 generates a digital model of a part. The digital model may be a nominal part specification representing a nominal version of the part with respect to one or more of part dimensions or material state. A producing operation 304 produces a physical instance of the part represented by the digital model. The producing operation 304 may include any appropriate manufacturing or fabrication technique, such as those described above or others.

A performing operation 306 includes performing resonance inspection of the physical instance of the part. The performing operation 306 results in the generation of a physical resonance result for the physical instance of the part produced in the producing operation 304. The physical resonance result may be a resonance response of the physical instance of the part to a plurality of input frequencies. For example, the resonance response may include a frequency domain representation of the resonance response of the physical part in which resonance frequencies are identified as resonance peaks in a frequency curve in the frequency domain. In an example, the physical resonance result may also identify vibrational mode shapes associated with each resonance peak in the resonance response. Surface vibration measurement may be used to identify a mode shape for a given resonance peak in the physical resonance result.

An inputting operation 308 inputs assumed model parameters to the digital model of the part. The assumed model parameters may be selected at random or using any approach outlined above to generate the assumed model parameters. Also, the model parameters may be any of the parameters identified above related to material state, material orientation, physical dimensions or the like. A performing operation 310 performs a digital resonance inspection of the digital model using the assumed model parameters.

A comparing operation 312 compares the physical resonance result from the physical resonance inspection with the digital resonance result of the digital resonance inspection. The comparing operation 312 may include determining a residual error between the physical resonance result and the digital resonance result based on frequency error between corresponding resonance peaks having corresponding vibrational modes. The residual error may reflect differences between resonance peaks in the physical resonance result and the digital resonance result. In addition, the residual error may also reflect different amplitudes, phase, or other measure of resonance peaks between the physical resonance result and the digital resonance result. Further still, the residual error may reflect differences in relative resonance metrics between the physical resonance result and the digital resonance result (e.g., a comparison of a spread between a first resonance peak and a second resonance peak in the physical resonance result to a corresponding spread between a first resonance peak and a second resonance peak in the digital resonance result).

In any regard, an assigning operation 314 assigns evaluation model parameters to the model. This may involve varying one or more of the model parameters from the assumed model parameters. Selection of the evaluation model parameters may include any appropriate approach to selection of parameter values from a multidimensional distribution where each dimension represents a respective model parameter.

A performing operation 316 performs a digital resonance inspection of the digital model with the evaluation model parameters assigned in the assigning operation 314. In turn, a determining operation 318 determines if a convergence criteria is satisfied by the evaluation model parameters. The convergence criteria may be based on a residual error between the physical resonance result and the digital resonance result. If the convergence criterion is not satisfied, operation 318 may return to the assigning operation 314 such that new evaluation model parameters are assigned to the digital model. Operation may iterate over the assigning operation 314, performing operation 316, and determining operation 318 until the one or more convergence criterion is satisfied. Once the convergence criterion is satisfied, an assigning operation 320 assigns the evaluation module parameters that result in the convergence criterion being satisfied to the digital model to generate a DTI of the digital model for the physical instance of the part produced in the producing operation 304.

Once the model inversion has been performed to generate a DTI 128 for a physical instance 110 of a part, the DTI 128 may be used in a number of respects for evaluation of the physical instance 110 of the part represented by the DTI 128. Some examples of which are described in greater detail below. In general, use of the DTI 128 may allow various simulated conditions may be digitally applied to the DTI 128 for evaluation of how the physical instance 110 of the part behaves under the simulated conditions. As may be appreciated, generation and testing of the simulated conditions in a digital environment applied to the DTI 128 may provide advantages over physically testing the physical instance 110 of the part.

In a first regard, the digital testing or simulation applied to the DTI 128 may allow for testing to failure in the digital environment without actually destroying the physical instance 110. Performance boundaries may be established for the DTI 128, including performance characteristics of the DTI 128 leading up to failure. For instance, a failure analysis may be conducted on the DTI 128 to verify performance of the physical instance of the part without having to subject the physical instance of the part to testing to failure. In turn, one or more digital performance standards may be provided to which the DTI 128 may be compared. As described above, the digital performance standard may relate to ultimate performance of a part, performance within some defined range, or in-service performance. In any regard, a digital sort may be used in which the results of testing of the DTI 128 are compared to the digital performance standards to characterize the DTI 128, and in turn, the physical instance 110.

Furthermore, digital simulation may allow for a simulated elapsed time to be modeled in an accelerated time period. This digital modeling may be performed more quickly that accelerated physical testing may occur. For instance, part performance may be simulated for a very long span of part use in an accelerated manner. As such, years of use of the part may be simulated using the DTI 128 in a much compressed time frame (e.g., in minutes or hours). In this regard, simulation of the operation of the part and the resulting performance characteristics of the part may be very quickly produced. Such simulation may allow for evaluation of the suitability of the physical instance 110 of the part for application in certain conditions or environments. Such simulated use may be performed more quickly than traditional part qualification testing.

Additionally or alternatively, maintenance schedules may be generated based on the simulated part usage such that specific maintenance intervals may be established on a need basis for individual physical instances 110 of the part. Further still, simulated wear or usage of the DTI 128 may allow for evaluation of the physical instance 110 of the part through the lifespan of the physical instance 110. That is, a physical resonance result for the physical instance 110 of the part may be compared to a corresponding digital resonance result for the DTI 128 at various points in time during the lifespan of the part to determine if the physical instance 110 is aging in an acceptable or expected manner.

Figure 4:
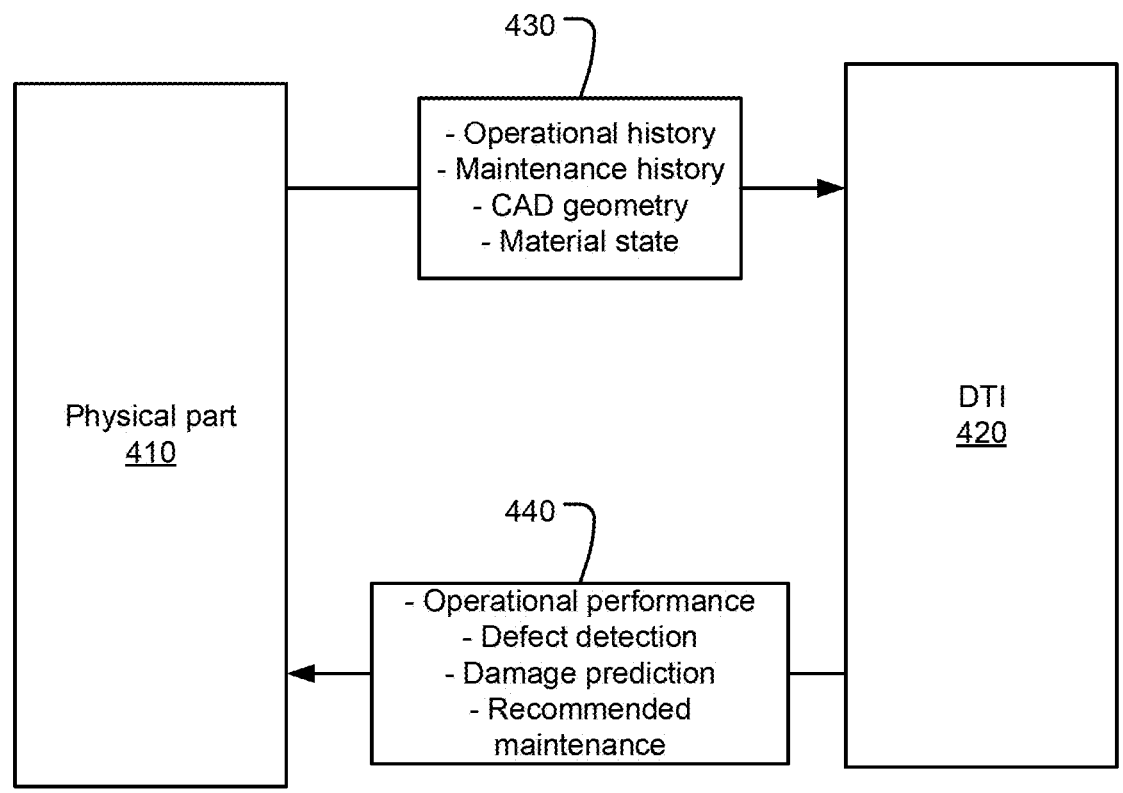
FIG. 4 depicts an example of information exchange that is facilitated between a physical instance of a part and a digital twin instance of the physical part.

As discussed in greater detail below, once a DTI is generated for a physical instance of a part, the DTI may be used in a number of ways in relation to evaluation/testing of the physical instance of the part. FIG. 4 illustrates a number of information flows that may be used in relation to a physical instance of a physical part 410 and a DTI 420 for the part. For example, physical information 430 collected in relation to the physical part 410 such as operational history, maintenance history, CAD geometry information, and material state may be imparted to the DTI 420. As can be appreciated, the CAD geometry information and material state information may be imparted to the DTI 420 in relation to the model inversion process described above.

The operational history and maintenance history of the physical information 430 provided to the DTI 420 may be actual or modeled information regarding the physical conditions to which the part is exposed. For example, the operational history for the physical part 410 may be measured as the physical part 410 undergoes service (e.g., in the field, during testing, etc.). This measured history of the physical part 410 may include operational information (e.g., number of cycles, operation time, operation speeds, etc.). The measured history of the physical part 410 may also include measured environmental parameters to which the part 410 has been exposed such as temperature or the like. Alternatively, simulated use of the physical part 410 may be provided. This may include operational simulation, load simulation, or simulated environmental factors. For example, estimated environmental parameters may be attributed to the DTI for evaluation of the DTI 420 and physical part 410.

In turn, model information 440 may be used to make determinations regarding the physical part 410. The model information 440 may include operational performance information, defect detection, damage prediction, or recommended maintenance for the physical part 410. The generation and use of this model information 440 generated from the DTI 420 is described in greater detail below.

Figure 13:
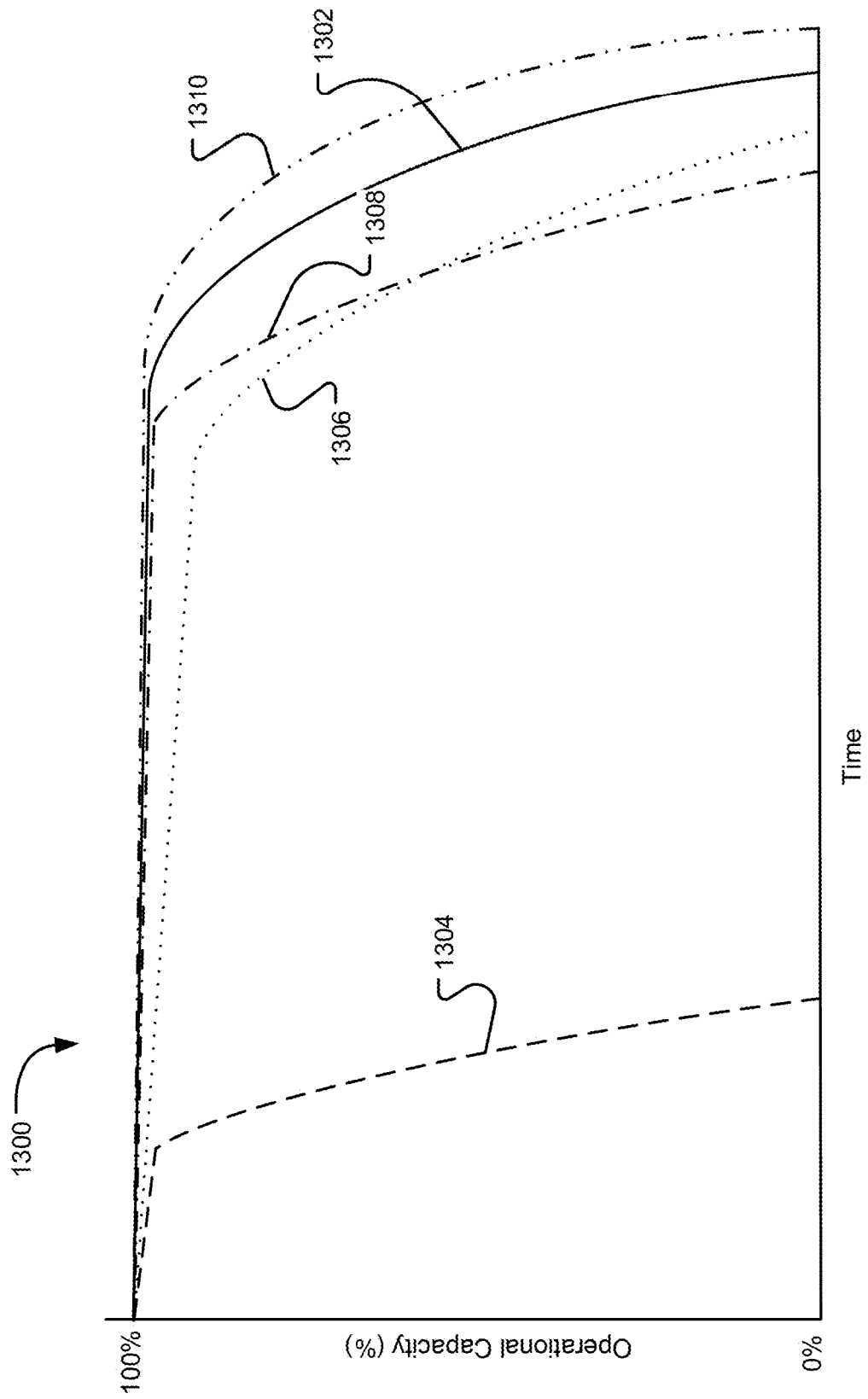
FIG. 13 depicts an example of a plot including a plurality of different performance curves that are generated based on simulations of a digital twin instance of a physical instance of a part.

With further reference to FIG. 13, various examples of part performance curves are shown in a plot 1300. The plot 1300 includes a horizontal axis representative of time and a vertical axis representative of an operational capacity ranging from 0% to 100%. The operational capacity indicator may be a remaining life value represented as a percentage of a projected life span for the part, a percentage of optimal performance demonstrated by the part, or other metric representative of the performance of the part. The performance curves 1302-1310 may represent various potential circumstances associated with a part. In turn, each of the performance curves may be determined using simulated usage of a part over time in various ones of the circumstances using a DTI for a physical instance of a part. In turn, the operational curves 1302-1310 may be used to determine appropriate maintenance intervals for a part corresponding to one of the identified circumstances or a physical part may be compared (e.g., using comparative resonance inspection) to one or more of the operational curves to determine an operational condition for the physical part.

For example, curve 1302 may represent an idealized part having a nominal material state that operates in nominal operational conditions. That is, curve 1302 may be a baseline part representing completely nominal part life. Curve 1304 represents the part life of a part having a manufacturing defect. Thus, after a brief period of relatively nominal operation, performance may deteriorate rapidly and prematurely compared to curve 1302.

Curve 1306 represents a part having lower specification material states compared to nominal. In this regard, the operational life may deteriorate prematurely compared to curve 1302, but otherwise degrade predictably. If a part is identified as corresponding to this condition, more regular or frequent maintenance intervals may be established to monitor the progress of the part. Curve 1308 may represent performance of a part in a harsh environment such as a high temperature environment, a corrosive environment, or the like. Again, performance of the part may be relatively nominal for a period with more rapid degradation of performance as compared to the nominal part in curve 1302. Again, identification of a part corresponding to curve 1308 may be subjected to more regular or frequent maintenance.

Finally, curve 1310 may represent a part with exceptional material state (e.g., idealized material state or the like) or a part operating an extremely mild environment. As can be appreciated, performance of such a part may be extended relative to the nominal curve 1302 such that maintenance intervals may be extended or less frequency as compared to a nominal or less performant part.

Figure 5:
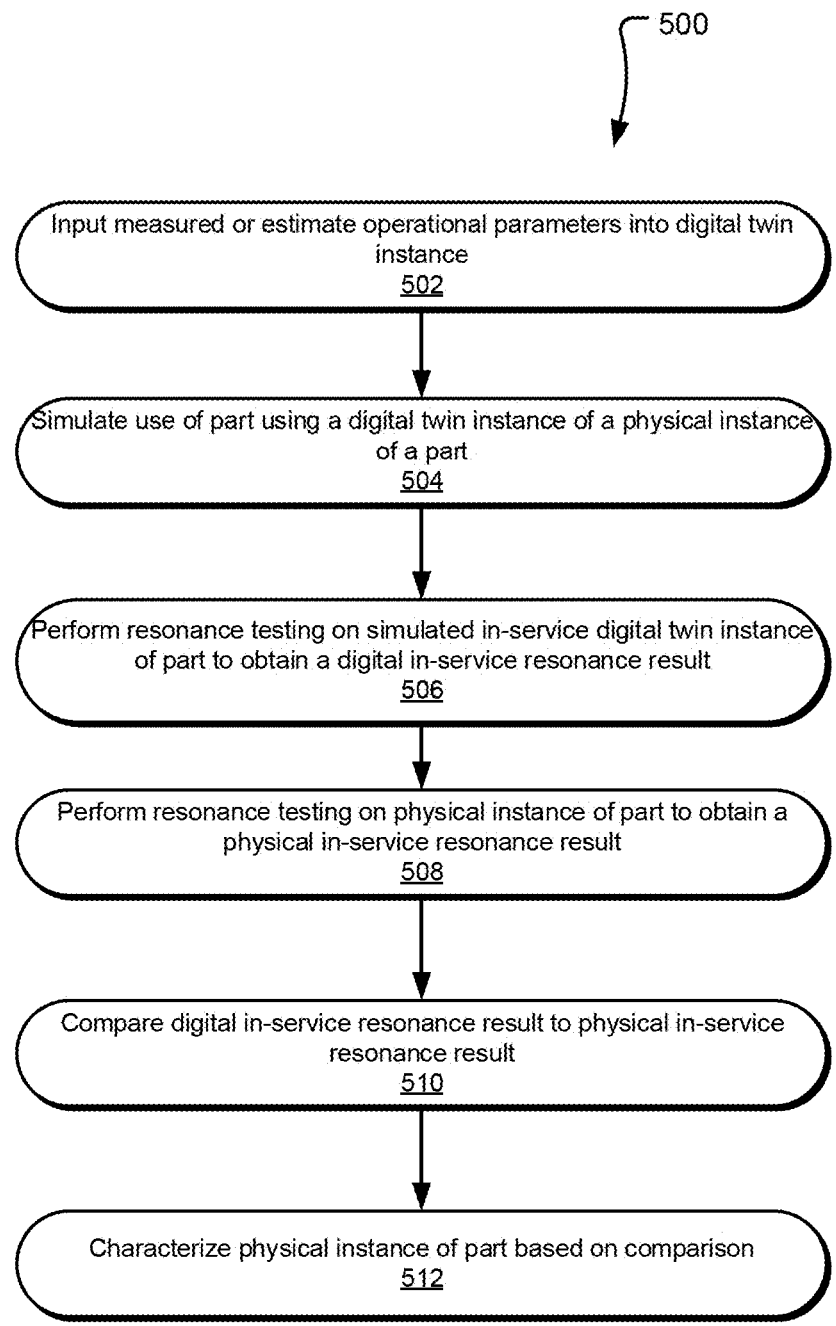
FIG. 5 depicts example operations for use in evaluating an in-service part using a digital twin instance of the in-service part.

FIG. 5 depicts example operations 500 for evaluation of an in-service part using a DTI for the part. As can be appreciated, FIG. 5 initiates with a DTI of a part. In this regard, the operations 500 may rely on creation of a DTI for the part as described above or may simply be provided for operation on a DTI for a given part regardless of the manner in which the DTI is generate. An inputting operation 502 inputs measured or estimated operational parameters into the DTI for the given physical part to be evaluated.

As will be appreciated, any of the operational parameters input to the model in the inputting operation 502 may be either estimated or measured. For example, when providing operational parameters, past or future operational parameters related to the performance of the part may be provided. Such estimated operational parameters may relate to operational parameters for the part that are anticipated to occur such that the estimate is generated prior to the in-service part having been put into service. These estimates may be used to forecast part performance (e.g., even prior to the part being put into service). Alternatively or additionally, the estimated operational parameters may relate to estimated operational conditions in which the part has been in-service. In this later regard, in which the in-service part has undergone service, one or more operational parameters may be actual measured values for the conditions experienced by the part. As such, the operational parameters input to the DTI may be all estimated, all measured, or some operational parameters may be estimated, and others may be measured. Further still, the measured values may relate to an environment in which the part is to be put into service.

The operational parameters may comprise any estimated or measured factor that relates to part performance. For example, operational parameters may relate to the use of the part. These values for operational use parameters may include a number of hours of operation of the part, a number of cycles the part has experienced, or any other information related to the amount the part has been used. The operational parameters may be estimated operational parameters or actual (e.g., measured) operational parameters.

Other parameters may also be used such as environmental parameters. The environmental parameters may relate to temperatures to which the part has been exposed, humidity to which the part has been exposed, interaction with chemicals in contact with the part, or the like.

In any regard, the inputting operation 502 may input any appropriate operational parameters to the DTI. In turn, a simulating operation 504 simulates, using the DTI and operational parameters, the use of the physical instance of the part and the associated effects on the part. The simulating operation 504 may include any appropriate digital modeling techniques to provide the simulated use of the part. This may include FEA of the part with simulated loads based on the operational use parameters and/or environmental parameters. As an example, a turbine blade for a turbine engine may be the in-service part to be evaluated. In this regard, operational use parameters regarding the number of hours of use and/or the engine speed may be estimated or measured. In turn, the simulating operation 504 may simulate the effects of such use on the part to be evaluated. Moreover, environmental parameters such as ambient air intake temperature or the like may be input to the DTI to more faithfully simulate the actual state of the in-service part using the DTI. As described above, the environmental parameters may be measured environmental parameters or estimated environmental parameters.

In turn, performing operation 506 performs digital resonance inspection testing on the DTI in view of the simulated use of the simulating operation 504. The performing operation 506 generates a digital resonance result for the simulated in-service part represented by the DTI. A performing operation 508 performs a physical resonance inspection on the in-service part. In turn, a comparing operation 510 compares the digital resonance result for the simulated in-service DTI with the physical resonance result of the physical instance of the in-service part.

A characterizing operation 512 characterizes the physical instance of the in-service part in response to the comparing operation 510. The characterizing of the physical instance of the in-service part may classify the physical instance of the in-service part as "acceptable" or "unacceptable." Other descriptors such as a compliant part status or an uncompliant part status may be used. However, a binary classification is not strictly required. For example, other characterizations may be applied to the in-service part such as grading of the part relative to more than two classes. Furthermore, quantitative measures may be applied such as an estimated remaining life of the part.

Figure 9:
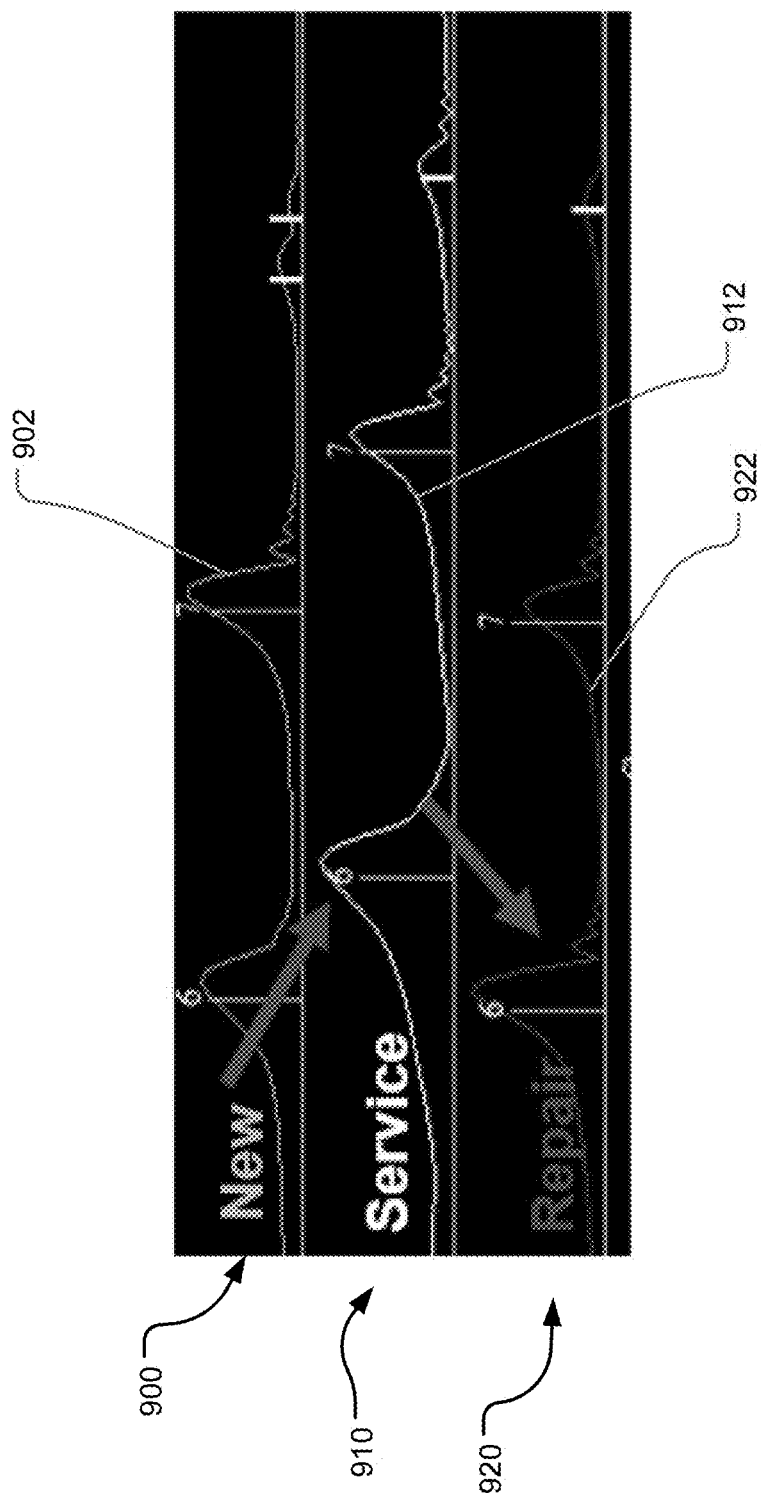
FIG. 9 depicts example digital resonance inspection results that indicate a new part, a part in need of service, and a damaged part in need of repair.

With further reference to FIG. 9, simulated use of the DTI may allow for resonance results to be generated that may assist in characterization of a part. For instance, in FIG. 9, the DTI may be subjected to simulations to create a new part resonance response 900, an in-service part resonance response 910, and a repaired resonance response 920. Additionally, the DTI may be subjected to FEA analysis to determine performance limits for the physical instance of the part. For instance, the in-service part resonance response 910 may represent a resonance result for a part that is in need of service, which is identified through performance characteristics provided by the DTI. As such, the physical instance of the part that is in-service may be tested to evaluate the physical resonance result relative to the digital results represented in FIG. 9 to determine if the physical instance of the part is behaving as expected based on the simulated performance of the DTI.

Figure 6:
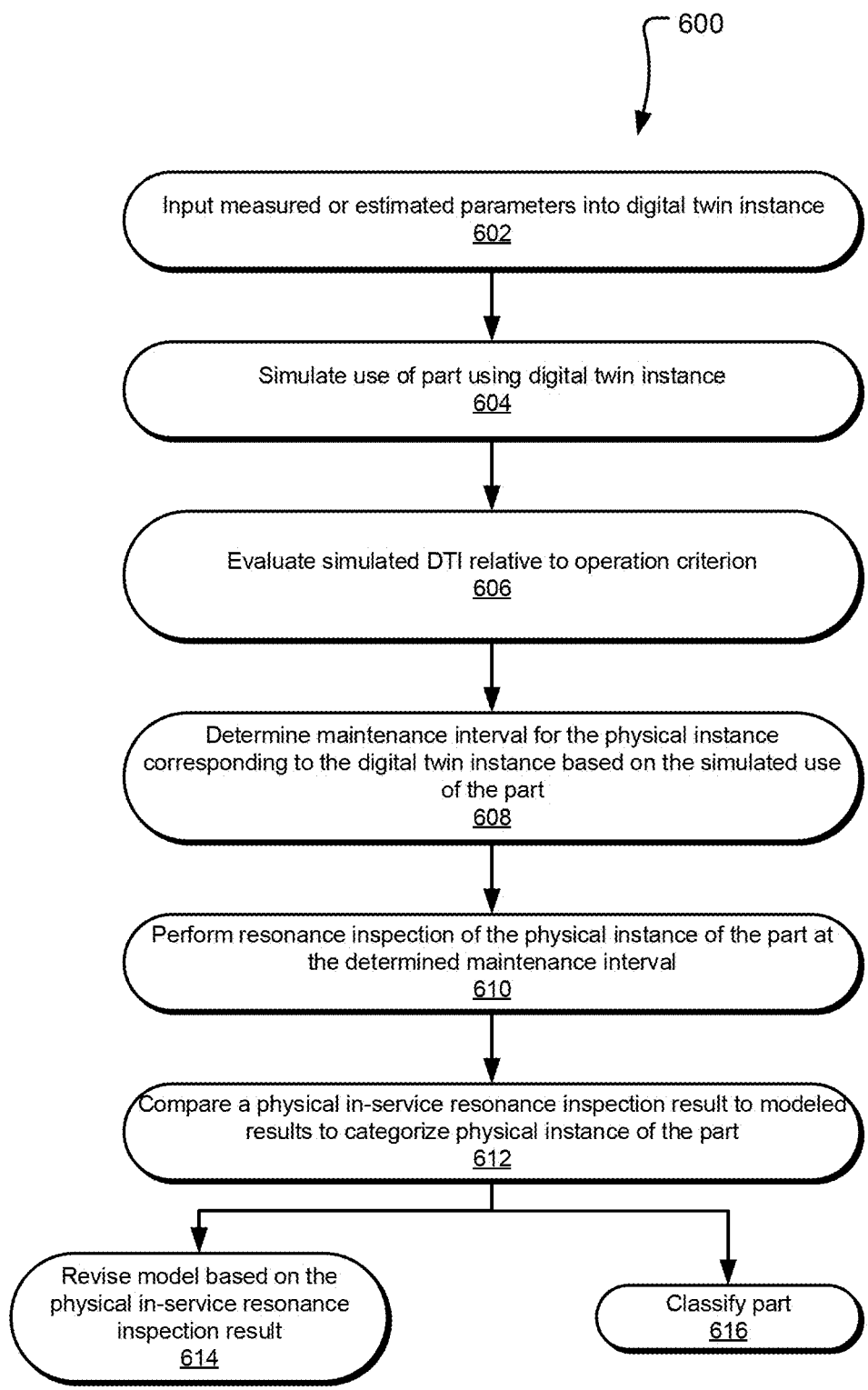
FIG. 6 depicts example operations for use in determining a maintenance schedule for a specific physical instance of a part using an associated digital twin instance.

FIG. 6 depicts example operations 600 for use of a DTI in determining a maintenance interval for an in-service part. The operations 600 include an inputting operation 602 that inputs operational parameters to the DTI. As described above, the operational parameters may be any measured or estimated operational parameters including operational use parameters, operational environmental parameters, or the like. In turn, a simulating operation 604 simulates the use of the physical instance of the part using the DTI for the physical instance of the part. An evaluation operation 606 evaluates the DTI having undergone simulated use relative to operation criteria. Such operation criteria may relate to any value or property associated with a part that may require evaluation for safety or operational performance.

A determining operation 608 determines a maintenance interval for the physical instance of the part based on the evaluation operation 606. For example, traditionally maintenance intervals may be set globally for a given part without specific consideration to individual physical part properties or the conditions in which individual parts are operated. As such, these maintenance intervals may be designed with a factor of safety in view of the worst performing acceptable parts in the most rigorous environmental conditions. This may result in more or more frequent maintenance intervals for parts that do not require such rigorous maintenance (e.g., due to improved individual part performance or operation in less rigorous environments). By evaluation in the evaluation operation 606 of the DTI for a specific physical instance of a part in the measured or estimated conditions in which the part is used, a maintenance interval for a specific physical instance of a part may be established to avoid costly and time consuming over-rigorous maintenance intervals.

Figure 10:
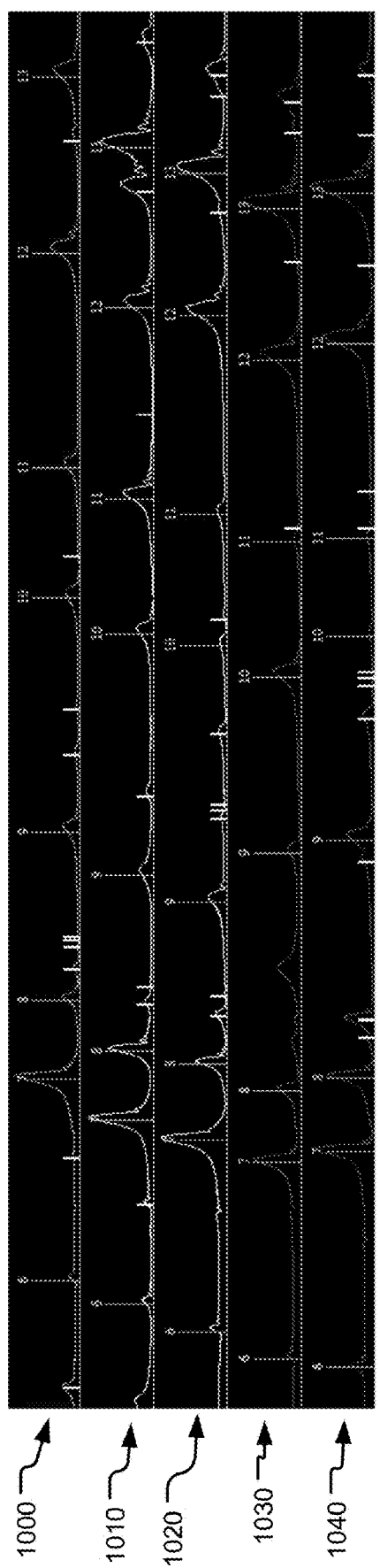
FIG. 10 depicts example digital resonance inspection results that illustrate the effect of various operational conditions for a part on resonance inspection results for the part.

With reference to FIG. 10, a number of resonance response plots 1000, 1010, 1020, 1030, and 1040 are depicted. Plot 1000 illustrates a resonance response for a new part. Plot 1010 illustrates a resonance response for a part having low hours or light duty. Plot 1020 illustrates a resonance response of a part having high hours or heavy duty. Plot 1030 illustrates a resonance response for a part exposed to over-temperature situations. Plot 1040 illustrates a resonance response for a part that has been damaged. As can be appreciated from these plots, acceptable resonance results may be identified in relation to operational conditions to which the part is exposed. Such testing of the DTI may allow for determinations to be made for a maintenance interval for a given part. Moreover, testing of the physical part may allow the part to be evaluated in relation to one or more of the conditions modeled to create the plots 1000-1040 shown in FIG. 10.

Figure 11:
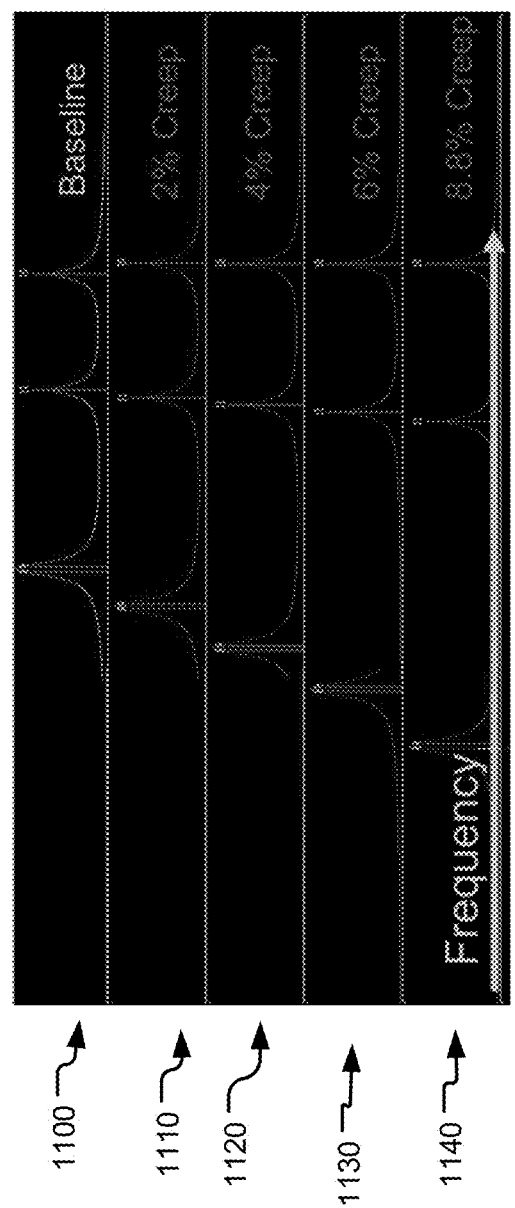
FIG. 11 depicts example resonance inspection results that illustrate the effect of part creep on the resonance inspection results for the part.

Furthermore, the DTI may be used to model physical changes to a part. For instance, a part may experience creep during use. In turn, the DTI for a given part may be used to simulate such creep conditions and create resonance response results that correspond to different creep conditions. FIG. 11 illustrates such resonance responses. Plot 1100 illustrates a baseline or new part response. Plot 1110 illustrates a 2% creep condition, Plot 1120 illustrates a 4% creep condition, plot 1030 illustrates a 6% creep condition, and plot 1140 illustrates an 8.8% creep condition. In turn, the plots 1100-1140 illustrated in FIG. 11 may allow for evaluation of the effect of such creep conditions on the part and may facilitate identification of such conditions in the in-service physical instance of the part.

With returned reference to FIG. 6, the operations 600 may include evaluation of a part relative to the modeled DTI (e.g., during a maintenance interval once established). A performing operation 610 performs a resonance inspection of the physical instance of the part to generate a physical resonance result. A comparing operation 612 compares the physical resonance result to a digital resonance result to determine if the physical instance of the part is aging as expected. In turn, two potential operations may follow the comparing operation 612. In one example, a classifying operation 616 classifies the part based on the comparing operation 612. For example, the part may be classified as compliant, non-compliant, or some other non-binary classification as described above. Furthermore, a revising operation 614 may revise the DTI, one or more model parameters, or operational parameters based on the comparing operation 612. For instance, if in-service parts evaluated using the operations 600 are consistently variant to the modeled performance of corresponding DTIs, this information may be used to modify one or more of the digital techniques described above to improve modeling accuracy.

Figure 12:
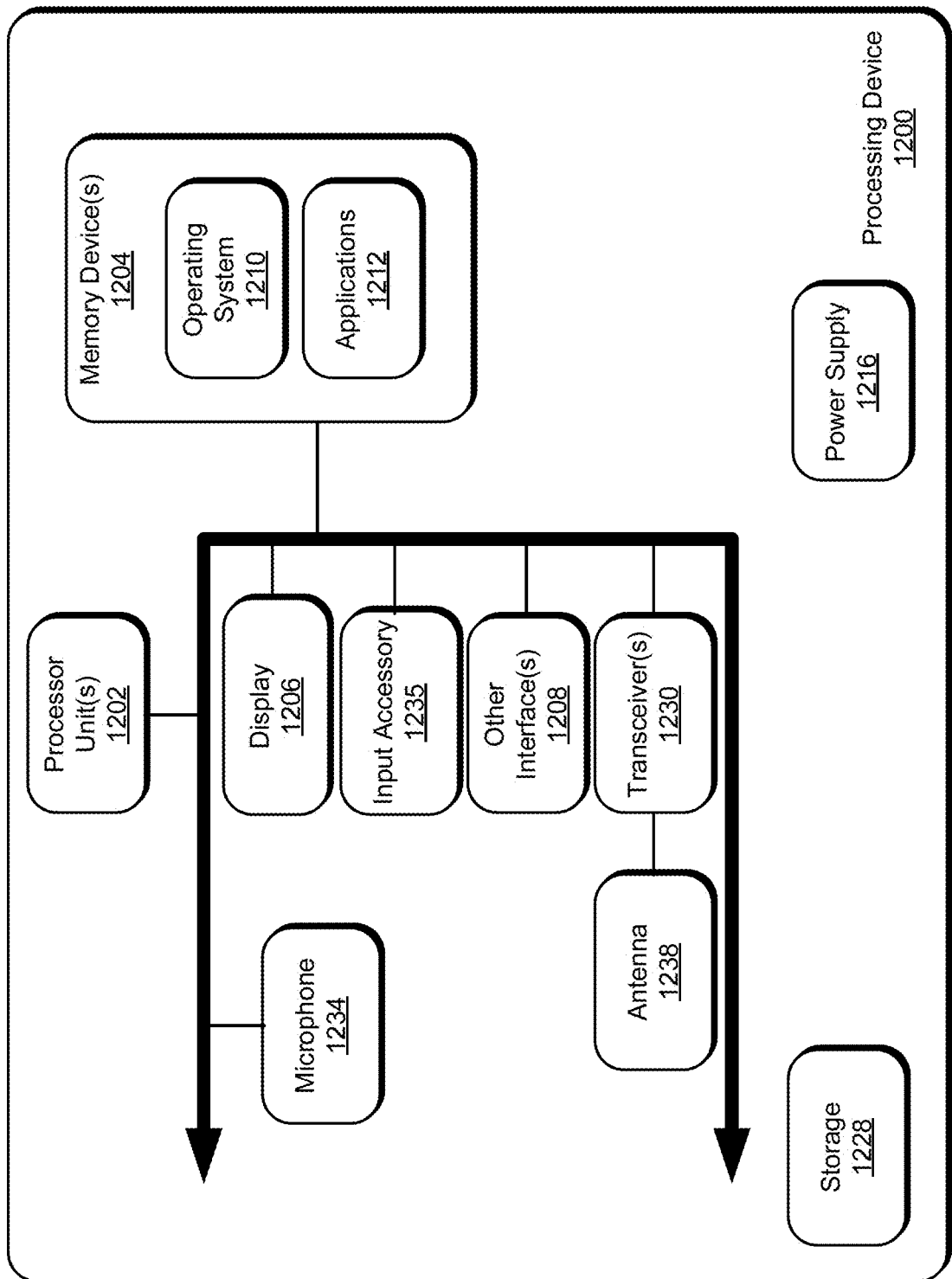
FIG. 12 depicts an example schematic of a processing device suitable for implementing aspects of the described technology.

Aspects of the foregoing may utilize a computer processing system. For instance, operation of the inversion optimization module 226, digital part analysis, digital model manipulation, vibrational testing apparatus, or the like may be executed using a computer processing system. One example of an appropriate processing device 1200 is shown in FIG. 12. FIG. 12 illustrates an example schematic of the processing device 1200 suitable for implementing aspects of the disclosed technology. The processing device 1200 includes one or more processor unit(s) 1202, memory 1204, a display 1206, and other interfaces 408 (e.g., buttons). The memory 1204 generally includes both volatile memory (e.g., RAM) and nonvolatile memory (e.g., flash memory). An operating system 1210, such as the Microsoft Windows® operating system, the Microsoft Windows® Phone operating system or a specific operating system designed for a gaming device, resides in the memory 1204 and is executed by the processor unit(s) 1202, although it should be understood that other operating systems may be employed.

One or more applications 1212 are loaded in the memory 1204 and executed on the operating system 1210 by the processor unit(s) 1202. Applications 1212 may receive input from various input local devices such as a microphone 1234, input accessory 1235 (e.g., keypad, mouse, stylus, touchpad, gamepad, racing wheel, joystick). Additionally, the applications 1212 may receive input from one or more remote devices such as remotely located smart devices by communicating with such devices over a wired or wireless network using more communication transceivers 1230 and an antenna 1238 to provide network connectivity (e.g., a mobile phone network, Wi-Fi®, Bluetooth®). The processing device 1200 may also include various other components, such as a positioning system (e.g., a global positioning satellite transceiver), one or more accelerometers, one or more cameras, an audio interface (e.g., the microphone 1234, an audio amplifier and speaker and/or audio jack), and storage devices 1228. Other configurations may also be employed.

The processing device 1200 further includes a power supply 1216. In turn, the power supply 1216 is powered by one or more batteries or other power sources and provides power to other components of the processing device 1200. The power supply 1216 may also be connected to an external power source (not shown) that overrides or recharges the built-in batteries or other power sources.

In any of the foregoing examples, one or more components may be executed by a processing device 1200 as depicted in FIG. 12. The processing device 1200 may include a variety of tangible processor-readable storage media and intangible processor-readable communication signals. Tangible processor-readable storage can be embodied by any available media that can be accessed by the processing device 1200 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor readable instructions, data structures, program modules or other data. Tangible processor readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 1200. In contrast to tangible processor readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for model inversion of a digital model of a part to create a digital twin instance for a physical instance of the part, the method comprising:
inputting evaluation model parameters to the digital model;
conducting one or more convergence digital analyses on the digital model using the evaluation model parameters to obtain an evaluation digital resonance inspection result based on the evaluation model parameters;
determining convergence parameters from the evaluation model parameters that result in the evaluation digital resonance inspection result that satisfies at least one convergence criterion relative to a physical resonance inspection result of the physical instance of the part, wherein the at least one convergence criterion is based on comparing corresponding resonance peaks in the evaluation digital resonance inspection result and the physical resonance inspection result having a common vibrational mode shape;
assigning the convergence parameters to the digital model to define a digital twin instance specific to the physical instance of the part;

digitally analyzing the digital model of the part based on the evaluation model parameters for the digital model to obtain the evaluation digital resonance inspection result;

performing a resonance inspection test on the physical instance of the part to obtain the physical resonance inspection result; and comparing the physical resonance inspection result with the evaluation digital resonance inspection result.

2. The method of claim 1, further comprising:

measuring one or more measured dimension of the physical instance of the part; and updating the digital twin instance to reflect the one or more dimension of the measured dimension of the physical instance of the part.

3. The method of claim 1, further comprising:

applying a digital sort to the digital twin instance based on a comparison of one or more modeled performance characteristics for the digital twin instance to digital performance standards for the part; and characterizing the physical instance of the part in response to the comparing to the digital sort.

4. The method of claim 3, wherein the characterizing comprises assigning at least one of a compliant part status or a non-compliant part status to the physical instance of the part.

5. The method of claim 3, wherein the one or more modeled performance parameters relate to simulated accelerated wear for the digital twin instance of the part.

6. The method of claim 3, wherein the one or more modeled performance parameters comprise failure analysis of the digital twin instance.

7. The method of claim 1, further comprising:

simulating changes of the physical instance of the part resulting from use of the part using the digital twin instance of the physical instance of the part.

8. The method of claim 7, further comprising:

creating a maintenance schedule for the physical instance of the part at least in part based on the modeled changes.

9. The method of claim 7, further comprising:

performing an in-service resonance inspection of the physical instance of the part after the physical instance of the part has been put into service to obtain a physical in-service resonance inspection result;

comparing the physical in-service resonance result to the modeled changes of the digital twin instance; and characterizing the physical instance of the part that is in-service in response to the comparing.

10. The method of claim 9, further comprising:

comparing the physical in-service resonance inspection result with physical resonance inspection result of the part as new to determine a change to the physical part; and wherein the comparing the physical in-service resonance result to the modeled changes of the digital twin instance comprises comparing the change to the physical part to the modeled changes.

11. The method of claim 9, wherein the characterizing operation comprises determining the physical instance of the part that is in-service is in a non-compliant status, the method further comprising:

updating a new part sort applied to new parts to determine a status of the new parts based on resonance results of the physical instance of the in-service part.

12. The method of claim 11, wherein the characterizing operation further comprises applying an in-service sort based on the physical in-service resonance inspection result and the modeled in-service digital twin instance.

13. The method of claim 12, wherein the in-service sort is based on modeled changes from a plurality of modeled in-service digital twin instances.

14. The method of claim 12, wherein the in-service sort is based on a plurality of physical resonance inspection results for a plurality of in-service parts.

15. The method of claim 12, wherein the in-service sort is based on a plurality of parts having undergone qualification testing.

16. The method of claim 9, further comprising:

updating the digital model based on the comparing operation.

17. The method of claim 7, wherein the simulating operation further comprises:

providing one or more operational parameters to the digital twin instance regarding operation of the physical instance of the part.

18. The method of claim 17, wherein at least one of the one or more operational parameters are measured from the operation of the physical instance of the part.

19. The method of claim 17, wherein at least one of the one or more operational parameters are estimated operational parameters for the operation of the physical instance of the part.

20. The method of claim 17, wherein the one or more operational parameters comprise at least one of an operational use parameters or an environmental parameter.

21. The method of claim 20, wherein the environmental parameter describes an environment in which the physical instance of that has been in-service.

22. The method of claim 21, wherein the environmental parameters comprise measured environmental parameters.

23. The method of claim 21, wherein the environmental parameters comprise estimated environmental parameters.

24. The method of claim 1, wherein the determining at least includes comparing a first resonance peak in the digital resonance in evaluation digital resonance inspection result and a second resonance peak in the physical resonance inspection results relative to the convergence criterion, and wherein the first resonance peak and the second resonance peak are identified as having a common vibrational mode.

* * * * *